US012757177B2

(12) United States Patent
Wang et al.

(10) Patent No.: US 12,757,177 B2
(45) Date of Patent: Oct. 6, 2026

(54) METHOD FOR OBTAINING INITIAL BANDWIDTH PART CONFIGURATION, TERMINAL, AND NETWORK-SIDE DEVICE

(71) Applicant: VIVO MOBILE COMMUNICATION CO., LTD., Guangdong (CN)

(72) Inventors: Lihui Wang, Guangdong (CN); Kai Wu, Guangdong (CN); Xueming Pan, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 304 days.

(21) Appl. No.: 18/407,804

(22) Filed: Jan. 9, 2024

(65) Prior Publication Data

US 2024/0155580 A1 May 9, 2024

Related U.S. Application Data

(63) Continuation of application No. PCT/CN2022/103804, filed on Jul. 5, 2022.

(30) Foreign Application Priority Data

Jul. 9, 2021 (CN) ......................... 202110780820.7

(51) Int. Cl.
*H04W 72/0453* (2023.01)
*H04L 5/00* (2006.01)
(Continued)

(52) U.S. Cl.
CPC ....... *H04W 72/0453* (2013.01); *H04W 72/20* (2023.01)

(58) Field of Classification Search
None
See application file for complete search history.

(56) References Cited

U.S. PATENT DOCUMENTS

2020/0204333 A1* 6/2020 Agiwal ................. H04L 5/0092
2021/0385053 A1* 12/2021 Laselva ................. H04W 72/23
(Continued)

FOREIGN PATENT DOCUMENTS

WO 2021128058 A1 7/2021

OTHER PUBLICATIONS

QUALCOMM Incorporated, "BW Reduction for RedCap UE", 3GPP TSG-RAN WG1 Meeting ∩107-e, R1-2112223, e-Meeting, Nov. 11-19, 2021.
(Continued)

*Primary Examiner* — Jenee Holland
(74) *Attorney, Agent, or Firm* — Price Heneveld LLP

(57) ABSTRACT

This application discloses a method for obtaining an initial bandwidth part configuration, a terminal, and a network-side device, and pertains to the field of wireless communications technologies. The method for obtaining an initial bandwidth part configuration in embodiments of this application includes: monitoring, by a first target terminal, a cell-defining synchronization signal block CD-SSB and obtaining target system information associated with the CD-SSB; and obtaining, by the first target terminal by decoding the target system information, a first initial bandwidth part BWP configured by a network-side device, where the first initial BWP is an initial BWP independently configured by the network-side device for the first target terminal, and a bandwidth of the first initial BWP does not exceed a maximum bandwidth capability supported by the first target terminal.

19 Claims, 6 Drawing Sheets

(51) Int. Cl.

| | |
|---|---|
| ***H04W 48/10*** | (2009.01) |
| ***H04W 48/12*** | (2009.01) |
| ***H04W 48/16*** | (2009.01) |
| ***H04W 68/02*** | (2009.01) |
| ***H04W 72/20*** | (2023.01) |
| ***H04W 72/23*** | (2023.01) |
| ***H04W 72/51*** | (2023.01) |
| ***H04W 74/00*** | (2009.01) |

(56) References Cited

U.S. PATENT DOCUMENTS

| | | | | |
|---|---|---|---|---|
| 2022/0232640 | A1* | 7/2022 | Lee | H04W 72/1268 |
| 2022/0279595 | A1* | 9/2022 | Jang | H04W 74/0833 |
| 2022/0330133 | A1* | 10/2022 | Chen | H04W 36/0061 |
| 2023/0110787 | A1* | 4/2023 | Li | H04W 72/0453<br>370/503 |
| 2023/0133904 | A1* | 5/2023 | Turtinen | H04W 8/24<br>370/329 |
| 2024/0049205 | A1* | 2/2024 | Fei | H04W 72/0453 |
| 2024/0098719 | A1* | 3/2024 | Sienkiewicz | H04W 72/0453 |

OTHER PUBLICATIONS

Lenovo, Motorola Mobility, "On UE complexity reduction features for RedCap", 3GPP TSG RAN WG1 Meeting ∩102e, R1-2005830, E-meeting, Aug. 17-Aug. 28, 2020.

CMCC, "Discussion on principles and framework of reduced capability NR", 3GPP TSG RAN WG1 ∩102-e, R1-2006220, e-Meeting, Aug. 17-28, 2020.

VIVO, Guangdong Genius, "Discussion on reduced maximum UE bandwidth", 3GPP TSG RAN WG1 ∩105-e, R1-2104365, e-Meeting, May 10-27, 2021.

Ericsson, "Reduced maximum UE bandwidth for RedCap", 3GPP TSG-RAN WG1 Meeting ∩105-e, R1-2104179, e-Meeting, May 19-27, 2021.

Samsung, "Bandwidth Reduction for RedCap UEs", 3GPP TSG RAN WG1 ∩105-e R1-2105316, e-Meeting, May 10-27, 2021.

First Korean Office Action for Korean Patent Application No. 10-2024-7004075 mailed Feb. 24, 2026, 9 pages.

Rapporteur (Ericsson), "RAN1 agreements for Rel-17 NR RedCap", 3GPP TSG RAN WG1 Meeting #105-e, R1-2106213, e-Meeting, May 19-27, 2021.

* cited by examiner

METHOD FOR OBTAINING INITIAL BANDWIDTH PART CONFIGURATION, TERMINAL, AND NETWORK-SIDE DEVICE

CROSS-REFERENCE TO RELATED APPLICATIONS

The present application is a continuation application of International Application No. PCT/CN2022/103804 filed on Jul. 5, 2022, which claims priority of Chinese Patent Application No. 202110780820.7, filed with the China National Intellectual Property Administration on Jul. 9, 2021 and entitled “METHOD FOR OBTAINING INITIAL BANDWIDTH PART CONFIGURATION, TERMINAL, AND NETWORK-SIDE DEVICE”, both of which are incorporated herein by reference in their entireties.

TECHNICAL FIELD

This application pertains to the field of wireless communications technologies, and specifically, relates to a method for obtaining an initial bandwidth part configuration, a terminal, and a network-side device.

BACKGROUND

In response to needs of vertical industries, in usage scenarios such as industrial wireless sensors, video surveillance, and wearable devices, complexity of terminals needs to be reduced in terms of the number of receive antennas, the number of transmit antennas, supported bandwidth, data and signal processing time for the terminal, terminal capability, and so on; such terminals can be referred to as reduced capability UEs (Reduced Capability UE, RedCap device/UE or RedCap/redcap for short). In terms of bandwidth, legacy terminals (or may be also referred to as old terminals, ordinary terminals, legacy devices, old devices, ordinary devices, or the like) need to support 100 MHz on frequency range (frequency range, FR) 1 and 200 MHz on FR2; however, a maximum bandwidth capability that can be supported by redcap UEs is 20 MHz on FR1 and 100 MHz on FR2.

When RedCap UEs and legacy terminals coexist in one network, if a network-side device configures an initial bandwidth part (initial BandWidth Part, initial BWP) for the RedCap UEs based on the capability of the legacy terminal, the configured initial BWP bandwidth may exceed the maximum bandwidth capability that the RedCap terminal can support. If the network-side device configures the initial BWP bandwidth within the capacity of the redcap UE, because reception performance of the redcap UE is not as good as that of the legacy UE due to capacity limitation of the redcap UE, for example, the number of receive antennas of the redcap UE is less than that of ordinary UE, the network may implement transmission for the redcap UE by using larger overheads and more resources, leading to excessive load on the BWP. This may result in transmission congestion of legacy terminals.

SUMMARY

Embodiments of this application provide a method for obtaining an initial bandwidth part configuration, a terminal, and a network-side device, so as to resolve the problem of configuring initial BWPs for terminals.

According to a first aspect, a method for obtaining an initial bandwidth part configuration is provided, including: monitoring, by a first target terminal, a cell-defining synchronization signal block (CD-SSB) and obtaining target system information associated with the CD-SSB; and obtaining, by the first target terminal by decoding the target system information, a first initial bandwidth part (BWP) configured by a network-side device, where the first initial BWP is an initial BWP independently configured by the network-side device for the first target terminal, and a bandwidth of the first initial BWP does not exceed a maximum bandwidth capability supported by the first target terminal.

According to a second aspect, an apparatus for obtaining an initial bandwidth part configuration is provided, applied to a first target terminal and including: a monitoring module configured to monitor a cell-defining synchronization signal block CD-SSB and obtain target system information associated with the CD-SSB; and an obtaining module, configured to: obtain, by decoding the target system information, a first initial bandwidth part BWP configured by a network-side device, where the first initial BWP is an initial BWP independently configured by the network-side device for the first target terminal, and a bandwidth of the first initial BWP does not exceed a maximum bandwidth capability supported by the first target terminal.

According to a third aspect, a method for configuring an initial bandwidth part is provided, including: transmitting, by a network-side device, configuration information of a first initial BWP in target system information associated with a CD-SSB; where the first initial BWP is an initial BWP independently configured by the network-side device for a first target terminal, and a bandwidth of the first initial BWP does not exceed a maximum bandwidth capability supported by the first target terminal.

According to a fourth aspect, an apparatus for configuring an initial bandwidth part is provided, including: a determining module configured to: determine configuration information for a first initial BWP; and a transmission module configured to: transmit the configuration information for the first initial BWP in target system information associated with a CD-SSB; where the first initial BWP is an initial BWP independently configured for a first target terminal, and a bandwidth of the first initial BWP does not exceed a maximum bandwidth capability supported by a first target terminal.

According to a fifth aspect, a terminal is provided, where the terminal includes a processor, a memory, and a program or instructions stored in the memory and capable of running on the processor, and when the program or the instructions are executed by the processor, the steps of the method according to the first aspect are implemented.

According to a sixth aspect, a terminal is provided, including a processor and a communication interface, where the processor is configured to implement the steps of the method according to the first aspect, and the communication interface is configured to communicate with a network-side device.

According to a seventh aspect, a network-side device is provided, where the network-side device includes a processor, a memory, and a program or instructions stored in the memory and capable of running on the processor, and when the program or the instructions are executed by the processor, the steps of the method according to the third aspect are implemented.

According to an eighth aspect, a network-side device is provided, including a processor and a communication interface, where the processor is configured to implement the steps of the method according to the third aspect, and the communication interface is configured to communicate with a terminal.

According to a ninth aspect, a readable storage medium is provided, where a program or instructions are stored in the readable storage medium, and when the program or the instructions are executed by a processor, the steps of the method according to the first aspect are implemented, or the steps of the method according to the third aspect are implemented.

According to a tenth aspect, a chip is provided, where the chip includes a processor and a communication interface, the communication interface is coupled to the processor, and the processor is configured to run a program or instructions to implement the steps of the method according to the first aspect or implement the steps of the method according to the third aspect.

According to an eleventh aspect, a computer program/program product is provided, where the computer program/program product is stored in a non-transitory storage medium, and the program/program product is executed by at least one processor to implement the steps of the method according to the first aspect or the steps of the method according to the third aspect.

In the embodiments of this application, the first target terminal monitors a cell-defining synchronization signal and PBCH block (Cell Defining Synchronization Signal and PBCH block, CD-SSB), obtains target system information associated with a detected CD-SSB, and obtains, by decoding the target system information, a first initial BWP configured by the network-side device, where the first initial BWP is an initial BWP independently configured by the network-side device for the first target terminal, and the bandwidth of the first initial BWP does not exceed the maximum bandwidth capability supported by the first target terminal. In this way, an independent or additional initial BWP can be configured for the first target terminal when reduced-capacity terminals and legacy terminals are in a same network, such that the bandwidth of the initial BWP is within the capacity of the first target terminal, and configuring an additional BWP for the first target terminal can reduce load on BWPs (in particular, initial uplink/downlink BWPs) for the legacy terminals, thereby improving transmission performance of the legacy terminals.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "I" generally indicates that the associated objects are in an "or" relationship.

It should be noted that technologies described in the embodiments of this application are not limited to a long term evolution (Long Term Evolution, LTE)/LTE-advanced (LTE-Advanced, LTE-A) system, and may also be used in various wireless communications systems, such as code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-carrier Frequency-Division Multiple Access, SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (New Radio, NR) system is described for an illustration purpose, and NR terms are used in most of the following descriptions, although these technologies may also be applied to other applications than an NR system application, for example, the 6th generation ($6^{th}$ Generation, 6G) communications system.

Figure 1:
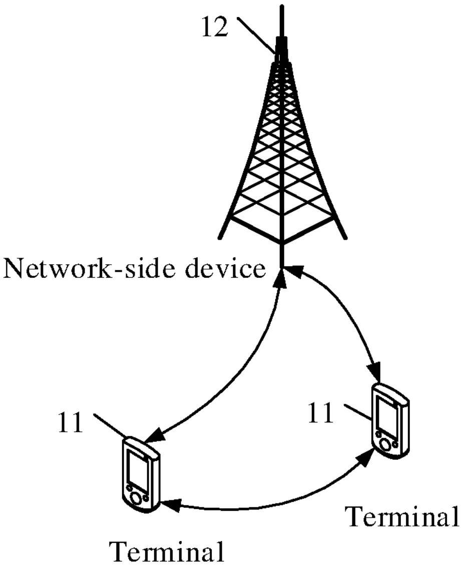
FIG. 1 is a schematic diagram of a wireless communications system to which the embodiments of this application are applicable.

FIG. 1 is a schematic diagram of a wireless communications system to which the embodiments of this application are applicable. The wireless communication system includes a terminal 11 and a network-side device 12. The terminal 11 may also be referred to as a terminal device or user terminal (User Equipment, UE), and the terminal 11 may be a terminal-side device, such as a mobile phone, a tablet computer (Tablet Personal Computer), a laptop computer (Laptop Computer) or a notebook computer, a personal digital assistant (Personal Digital Assistant, PDA), a palmtop computer, a netbook, an ultra-mobile personal computer (ultra-mobile personal computer, UMPC), a mobile Internet device (Mobile Internet Device, MID), a wearable device (Wearable Device) or vehicle user equipment (VUE), or pedestrian user equipment (PUE). The wearable device includes: a smart watch, a wrist band, earphones, glasses, or the like. It should be noted that a specific type of the terminal 11 is not limited in the embodiments of this application. The network-side device 12 may be a base station or a core network. The base station may be referred to as a NodeB, an evolved NodeB, an access point, a base transceiver station (Base Transceiver Station, BTS), a radio base station, a radio transceiver, a basic service set (Basic Service Set, BSS), an extended service set (Extended Service Set, ESS), a home NodeB, a home evolved NodeB, a WLAN access point, a Wi-Fi node, a transmission and reception Point (Transmitting Receiving Point, TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a scheme for obtaining an initial bandwidth part configuration provided in the embodiments of this application by using some embodiments and application scenarios thereof with reference to the accompanying drawings.

Figure 2:
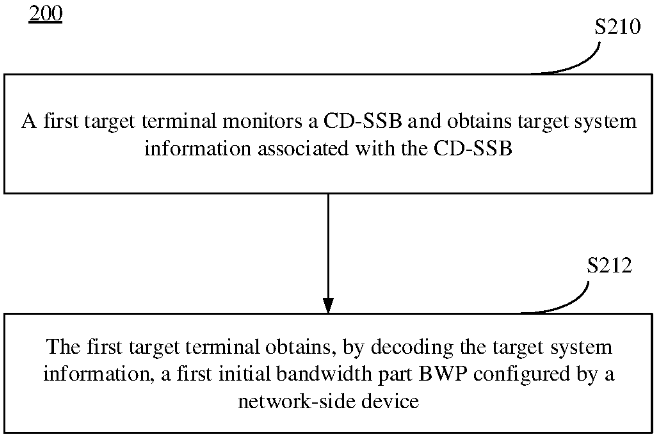
FIG. 2 is a schematic flowchart of a method for obtaining an initial BWP configuration according to an embodiment of this application.

FIG. 2 is a schematic flowchart of a method for obtaining an initial bandwidth part configuration according to an embodiment of this application. The method 200 may be executed by a first target terminal. In other words, the method may be performed by software or hardware installed on the first target terminal. As shown in FIG. 2, the method may include the following steps.

S210: The first target terminal monitors a CD-SSB and obtains target system information associated with the CD-SSB.

In related technologies, initial uplink/downlink BWPs, that is, initial DL BWP and initial UL BWP, may be configured in SIB1, and if the initial BWP is not configured, it is considered by default that a size of the initial BWP is a size of CORESET #0. The initial BWP is mainly used in an initial access procedure, for example, reception of system information block (System Information Block, SIB) 1, and reception of random access response (Random Access Response, RAR) and Message 4 (Msg4) as well as transmission of preamble and Message 3 (Msg3) in the random access procedure.

In the embodiments of this application, the target system information may be SIB1 or other SIB information, which is not limited in the embodiments of this application.

In a possible implementation, the first target terminal may obtain the target system information during cell search or initial access procedure. For example, the first target terminal may receive a CD-SSB, decode a master information block (Master Information Block, MIB) carried by a PBCH in the CD-SSB, obtain control resource set (Control Resource Set, CORESET) #0 information, listen to downlink control information (Downlink Control Information, DCI) for scheduling SIB1 in CORESET #0, and demodulate the SIB1 and other SIB information. The first target terminal obtains the target system information via the SIB1 and/or other SIB information.

In the embodiments of this application, the first target terminal may be a reduced-capability terminal or may be an ordinary terminal (or referred to as a legacy terminal). For example, if the network-side device expects to perform load-balance between bandwidths, an initial BWP may also be independently configured for ordinary terminals.

S212: The first target terminal obtains, by decoding the target system information, a first initial BWP configured by a network-side device, where the first initial BWP is an initial BWP independently configured by the network-side device for the first target terminal, and a bandwidth of the first initial BWP does not exceed a maximum bandwidth capability supported by the first target terminal.

In this embodiment of this application, the network-side device independently configures the first initial BWP for the first target terminal, that is, the first initial BWP configured by the network-side device is configured for the first target terminal and is at least not for other types of terminals on the same network.

Figure 3:
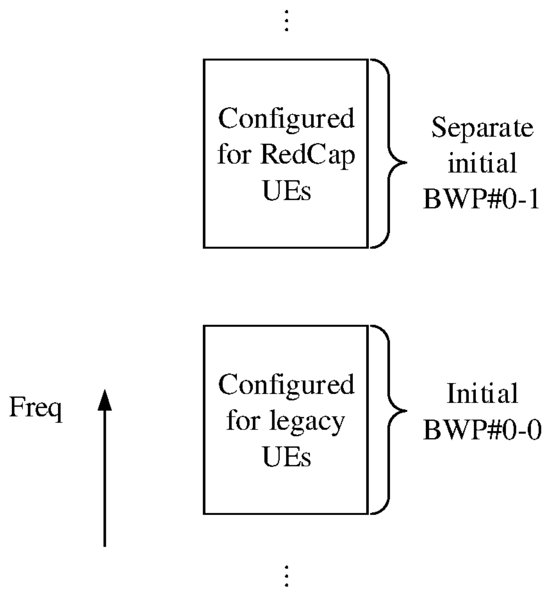
FIG. 3 is a schematic diagram of an initial BWP configuration according to an embodiment of this application.

For example, in FIG. 3, the network-side device configures a separate (or referred to as separate, additional, new, or the like.) initial BWP #0-1 (separate initial DL BWP #0-1) for a reduced-capability terminal and an initial BWP #0-0 (initial DL BWP #0-0) for a legacy terminal.

In a possible implementation, in a case that the network-side device configures no first target search space set for the first initial BWP, the first target terminal performs monitoring on and/or reception of a first control channel of the first target search space set on a second initial BWP, where the second initial BWP is an initial BWP configured by the network-side device for a second target terminal; and performs, based on a first control channel detected, reception of a first data channel scheduled by the first control channel. That is, in a case that the network-side device configures no first target search space set for the first initial BWP, the first target terminal performs monitoring on and/or reception of the first control channel on the second initial BWP configured by the network-side device for the second target terminal.

Optionally, the foregoing first target search space set includes, but is not limited to, at least one of the following search spaces:

(1) Type0 common search space (Common Search Space, CSS), where the Type0 CSS may be used for scheduling SIB1.

(2) Type0A CSS, where the type0A CSS may be used for scheduling other system information than SIB1, where the other system information may contain at least one of the following:

(a) other system information shared by redcap UEs and ordinary and/or legacy UEs;

(b) specific system information introduced or defined for redcap;

(3) Type1 CSS, where the Type1 CSS may be used for scheduling random access response (Random Access Response, RAR) and/or message B (Message B, MSGB);

(4) Type2 CSS, where the Type2 CSS may be used for scheduling paging messages;

(5) Type3 CSS, where the Type3 CSS may be used for scheduling common information for a group of UEs; and (6) user-specific search space (UE-specific Search Space, USS), where the USS may be used for scheduling user-specific information.

In a possible implementation, the performing, based on a first control channel detected, reception of a first data channel scheduled by the first control channel may include: performing, by the first target terminal, reception of the first data channel on the second initial BWP. That is, the first target terminal performs monitoring on and/or reception of the first control channel on the second initial BWP and also receives, on the second initial BWP, the first data channel scheduled by the first control channel. For example, the first target terminal performs, on the second initial BWP, monitoring on and/or reception of a physical downlink control channel (Physical downlink control channel, PDCCH) and a physical downlink shared channel (Physical downlink shared channel, PDSCH) scheduled by the PDCCH.

In a possible implementation, the first target terminal does not expect that a frequency domain resource occupied by the first control channel and/or a frequency domain resource occupied by the first data channel exceeds a maximum bandwidth capability supported by the first target terminal. For example, the first target terminal does not expect that a frequency domain resource occupied by the PDCCH and/or the PDSCH exceeds the maximum bandwidth capability supported by the first target terminal, so that during scheduling the PDCCH and/or the PDSCH, the network-side device controls the frequency domain resource occupied by the PDCCH and/or the PDSCH to be within the maximum bandwidth capability supported by the first target terminal. Alternatively, in a case that the frequency domain resource occupied by the first control channel exceeds the maximum bandwidth capability supported by the first target terminal and/or the frequency domain resource occupied by the first data channel exceeds the maximum bandwidth capability supported by the first target terminal, the first target terminal is not required to perform monitoring on and/or reception of the first control channel and/or the first data channel that is beyond the bandwidth capability of the first target terminal. For example, it may be specified or prescribed by a protocol that, in a case that the first control channel and/or the first data channel occupy a frequency domain resource that is beyond the maximum bandwidth capability supported by the first target terminal, the first target terminal may perform monitoring on and/or reception of only the first control channel and/or the first data channel within its bandwidth capacity.

In another possible implementation, the performing, based on a first control channel detected, reception of a first data channel scheduled by the first control channel may include: performing, by the first target terminal, reception of the first data channel on the first initial BWP. That is, the first target terminal performs monitoring on and/or reception of the first control channel on the second initial BWP and receives, on the first initial BWP, the first data channel scheduled by the first control channel. For example, the first target terminal performs monitoring on and/or reception of a PDCCH on the second initial BWP and performs, on the first initial BWP, monitoring on and/or reception of a PDSCH scheduled by that PDCCH.

For example, in FIG. 3, the terminal performs reception of the PDSCH on the separate initial DL BWP #0-1. That is, the control channel is transmitted on the initial DL BWP #0 and the data channel is transmitted on the separate initial DL BWP #0-1.

In still another possible implementation, the performing, based on a first control channel detected, reception of a first data channel scheduled by the first control channel may include:

in a case that the first target terminal shares a same first radio network temporary identifier (Radio Network Temporary Identifier, RNTI) with the second target terminal, receiving, by the first target terminal on the second initial BWP, a first data channel scheduled by a first control channel that is scrambled by the first RNTI. The first RNTI includes, but is not limited to, one of the following: a system information RNTI (System Information RNTI, SI-RNTI), a paging RNTI (Paging RNTI, P-RNTI), a random access RNTI (Random Access RNTI, RA-RNTI), a message B RNTI (MsgB-RNTI), a temporary Cell RNTI (Temporary Cell RNTI, TC-RNTI), a slot format indication RNTI (Slot Format Indication RNTI, SFI-RNTI), a transmit power control RNTI (Transmit Power Control RNTI, TPC-RNTI), a PUSCH-RNTI, and a TPC-PUCCH-RNTI; and/or, in a case that the first target terminal does not share a second RNTI with the second target terminal, receiving, by the first target terminal on the first initial BWP, a first control channel scrambled by the second RNTI, and/or a first data channel scheduled by the first control channel that is scrambled by the second RNTI. For example, an RNTI not shared by a redcap terminal and a legacy terminal may be an RNTI specific to UE or a group of UEs, such as a P-RNTI, a cell RNTI (Cell RNTI, C-RNTI), a configured scheduling RNTI (configured Scheduling RNTI, CS-RNTI), or a modulation and coding scheme cell RNTI (Modulation and coding scheme Cell RNTI, MCS-C-RNTI). In this case, the redcap terminal receives, on the first initial BWP, a PDSCH scheduled by the PDCCH that is scrambled by the specific RNTI.

For example, in the configuration mode shown in FIG. 3, if the network-side device does not configure at least one of the following search space sets (search space, SS) for the separate DL initial BWP #0-1:

(1) Type0 CSS;
(2) Type0A CSS;
(3) Type1 CSS;
(4) Type2 CSS;
(5) Type3 CSS; and
(6) UE-specific SS (US S).

Then, the terminal performs monitoring on and reception of a control channel (such as PDCCH) on DL initial BWP #0 for at least one of the foregoing types of search space sets, and based on the detected PDCCH, the terminal performs the operations of the following scheme 1, scheme 2, or scheme 3 for a PDSCH scheduled by the PDCCH.

Scheme 1: The terminal performs reception of the corresponding PDSCH on DL initial BWP #0.

Under this scheme, the terminal does not expect that a frequency domain resource occupied by a network-scheduled PDSCH exceeds the maximum bandwidth capability supported by the terminal; or if the frequency domain resource occupied by the network-scheduled PDSCH exceeds the maximum bandwidth capability supported by the terminal, the terminal is not required to perform monitoring on and reception of a PDCCH that exceeds its bandwidth capability.

Scheme 2: The terminal performs reception of the PDSCH on the separate initial DL BWP #0-1. That is, the control channel is transmitted on the initial DL BWP #0 and the data channel is transmitted on the separate initial DL BWP #0-1.

Scheme 3: scheme 1+scheme 2

If the redcap terminal and the legacy terminal share a same RNTI (such as SI-RNTI, P-RNTI, RA-RNTI, MsgB-RNTI, TC-RNTI, SFI-RNTI, TPC-PUSCH-RNTI, or TPC-PUCCH-RNTI), the redcap terminal performs scheme 1 for a PDSCH scheduled by a PDCCH that is scrambled by the same shared RNTI;

otherwise, the redcap terminal does not share the RNTI with the legacy terminal and has a UE or UE group-specific RNTI, such as P-RNTI, C-RNTI, CS-RNTI, or MCS-C-RNTI, the redcap terminal performs scheme 2 for a PDSCH scheduled by a PDCCH that is scrambled by the specific RNTI.

In a possible implementation of the embodiment of this application, the method may further include: in a case that the network-side device configures no second target search space set for the first initial BWP, but configures at least a third target search space set for the first initial BWP, performing, by the first target terminal, monitoring on and/or reception of a second control channel of the third target search space set on the first initial BWP; where the second target search space set includes: Type0 CSS; the third target search space set includes: Type2 CSS and/or Type0B CSS; and the second control channel is a control channel scrambled by a paging RNTI. That is, in a case that on the first initial BWP, no Type0 CSS is configured but a Type2 CSS and/or a Type0B CSS is at least configured, the first target terminal performs monitoring on and/or reception of the second control channel in the Type2 CSS and/or Type0B CSS on the first initial BWP.

Optionally, in the foregoing possible implementation, the method may further include: in a case that downlink control information carried by the second control channel includes first target information, switching, by the first target terminal, from the first initial BWP to a second initial BWP to receive updated system information; where the second initial BWP is an initial BWP configured by the network-side device for a second target terminal.

Optionally, the first target information includes but is not limited to at least one of the following:

(1) first indication information, where the first indication information indicates presence of a short message in the downlink control information;

(2) second indication information, where the second indication information indicates a change of system information;

(3) third indication information, where the third indication information indicates a change of system information transmitted on the second initial BWP; and (4) fourth indication information, where the fourth indication information is used to indicate an earthquake and tsunami warning system (Earthquake and Tsunami Warning System, ETWS) notification and/or a commercial mobile alert service (CAMS) notification, and the ETWS notification includes but is not limited to ETWS primary notification and/or ETWS secondary notification.

Optionally, in the foregoing possible implementation, the method may further include: in a case that downlink control information carried by the second control channel includes second target information, the first target terminal continues with reception of a paging data channel on the first initial BWP and/or transmits, on the first initial BWP, system information scheduled by Type0A CSS and/or Type0B CSS.

Optionally, the second target information includes at least one of the following:

(1) fifth indication information, where the fifth indication information indicates presence of paging scheduling information in the downlink control information; and (2) sixth indication information, where the sixth indication information indicates a change of system information transmitted on the first initial BWP.

In a possible implementation, the method may further include: in a case that the network-side device configures no second target search space set for the first initial BWP, but at least configures a third target search space set for the first initial BWP, if a paging early indication signal (Paging Early Indicator, PEI) is not configured for the first target terminal on a second initial BWP, determining, by the first target terminal based on its own setup, a first moment for switching to the first initial BWP to perform a paging physical procedure, where the second initial BWP is an initial BWP configured by the network-side device for a second target terminal; where the second target search space set includes: Type0 CSS; and the third target search space set includes: Type2 CSS and/or Type0B CSS. That is, in a case that on the first initial BWP, no Type0 CSS is configured but a Type2 CSS and/or a Type0B CSS is at least configured, if no PEI transmission is configured on the second initial BWP for the first target terminal, the first moment for switching to the first initial BWP to perform the paging physical procedure depends on implementation of the first target terminal.

In another possible implementation of the embodiment of this application, the method may further include: in a case that the network-side device configures no second target search space set for the first initial BWP, but at least configures a third target search space set for the first initial BWP, if a paging PEI is configured and transmitted for the first target terminal on a second initial BWP, determining, by the first target terminal based on indication of the paging PEI, whether to switch to the first initial BWP to perform a paging physical procedure, where the second initial BWP is an initial BWP configured by the network-side device for a second target terminal; where the second target search space set includes: Type0 CSS; and the third target search space set includes: Type2 CSS and/or Type0B CSS. That is, in a case that on the first initial BWP, no Type0 CSS is configured but a Type2 CSS and/or a Type0B CSS is at least configured, if a paging PEI is configured and transmitted on the second initial BWP for the first target terminal, it is determined, based on the indication of the paging PEI, whether to switch to the first initial BWP to perform a paging physical procedure.

In the foregoing possible implementation, optionally, the determining, by the first target terminal based on indication of the paging PEI, whether to switch to the first initial BWP to perform a paging physical procedure may include:

in a case that the paging PEI indicates that the first target terminal needs to monitor a third control channel scrambled by a paging RNTI, switching, by the first target terminal, to the first initial BWP at a second moment to perform the paging physical procedure; and/or in a case that the paging PEI indicates that the first target terminal does not need to monitor the third control channel scrambled by the paging RNTI, skipping switching, by the first target terminal, to the first initial BWP.

In the foregoing possible implementation, the second moment may be n+delta symbols/slots, where n is a moment at which the first target terminal receives PEI signaling, and this moment may be a slot in which the PEI signaling is located or the last symbol of all symbols occupied by the PEI signaling; delta is a switching time requirement specified by the protocol, and the switching time requirement depends on at least one of the following conditions:

(1) sub-carrier spacing of the first initial BWP;

(2) sub-carrier spacing of the second initial BWP; and (3) switching capability of the first target terminal.

In the foregoing possible implementation, paging indicated by the paging PEI includes grouping terminals based on at least one of the following to support paging of terminal groups:

terminal type; and terminal capability.

In the foregoing possible implementations, the performing a paging physical procedure includes at least one of the following: performing monitoring on and/or reception of a control channel scrambled by a paging RNTI on Type2 CSS, and performing reception of a paging data channel.

For example, in the configuration manner shown in FIG. 3, if the Type0 CSS is not included for the separate DL initial BWP #0-1, but at least the Type2 and/or Type0B CSS is included, the following scheme 1 or scheme 2 is performed.

Scheme 1: A redcap terminal in RRC-IDLE and/or INACTIVE state preferentially performs monitoring on and reception of a PDCCH scrambled by P-RNTI in the Type2 CSS on the separate DL initial BWP #0-1; where if DCI carried by the PDCCH includes at least one of the following information, the terminal needs to switch from BWP #0-1 to BWP #0 to receive updated system information:

(1) a short message indicator field of the DCI indicates that a short message is present in the DCI (short message is/are present in the DCI);

(2) a value of the most significant bit in an 8-bit field of the short Message is 1, indicating a change of system information;

(3) a value of the 4th, 5th, 6th, 7th, or 8th bit in the 8-bit field of the short message is 1, indicating a change of system information transmitted on BWP #0; and (4) a value of the 2nd bit in the 8-bit field of the short message is 1, indicating an ETWS primary notification and/or an ETWS secondary notification and/or a CMAS notification (indication of an ETWS primary notification and/or an ETWS secondary notification and/or a CMAS notification).

Otherwise, the redcap terminal continues to perform reception of a paging PDSCH on BWP #0-1 and/or transmits a change of system information scheduled by Type0B CSS and/or Type0A CSS on BWP #0-1, if the DCI carried by the PDCCH includes at least one of the following information:

(1) the short message indicator field (field) indicates that scheduling information for paging is present in the DCI (scheduling information for Paging is/are present in the DCI); and (2) a value of the 4th, 5th, 6th, 7th, or 8th bit in the 8-bit field of the short message is 1, indicating a change of system information transmitted on BWP #0-1.

Scheme 2:

If transmission of PEI is not configured for the redcap terminal on DL initial BWP #0, it depends on implementation of the redcap terminal. That is, the redcap terminal determines a time for switching to DL separate initial BWP #0-1 to perform a related paging physical procedure, including monitoring on and reception of PDCCH scrambled by P-RNTI in Type2 CSS, reception of paging PDSCH, and so on.

If the PEI for the terminal is configured and transmitted on DL initial BWP #0:

(1) If the PEI indicates that the terminal is required to monitor a PDCCH scrambled by P-RNTI, the terminal needs to switch to DL separate initial BWP #0-1 at a second moment to perform the related paging physical procedure, including at least one of paging PDCCH and paging PDSCH.

The second moment may be n+delta symbols/slots, where n is a first moment at which the terminal receives PEI signaling, and the first moment may be a slot in which the PEI signaling is located or the last symbol of all symbols occupied by the PEI signaling; delta is a switching time requirement specified by the protocol, and the switching time requirement depends on at least one of the following conditions:

sub-carrier spacing of DL and/or UL separate initial BWP #0-1;

sub-carrier spacing of DL and/or UL initial BWP #0; and switching capability of the device.

(2) If the PEI indicates that the terminal is not required to monitor a PDCCH scrambled by P-RNTI, the terminal is not required to switch to separate initial BWP #0-1.

The PEI described above is a paging early indicator that may support a group of terminals (UE subgroup) based on terminal type (for example, ordinary terminal or RedCap terminal) and/or terminal capability (for example, maximum bandwidth, maximum number of receive antennas, full duplex, or half duplex).

In a possible implementation, the method may further include: in a process of random access performed by the first target terminal, in a case that a center frequency of a third BWP for uplink transmission is different from a center frequency of a fourth BWP for downlink transmission corresponding to the uplink transmission, performing, by the first target terminal, the following operations:

the first target terminal transmits a preamble or message A on the third BWP in which a physical random access channel PRACH resource is located;

the first target terminal switches its operating frequency to a frequency corresponding to the fourth BWP, opens one time window at a third moment, and receives, within the time window, a fourth control channel and a random access response scheduled by the fourth control channel, where the fourth control channel is scrambled by a random access RNTI or scrambled by a message B RNTI;

the first target terminal switches its operating frequency to a frequency corresponding to the third BWP and transmits a RAR-scheduled uplink data channel on the uplink BWP at a fourth moment;

the first target terminal receives a downlink data channel scheduled by the fourth control channel; and the first target terminal performs feedback for the received downlink data channel.

Optionally, in a possible implementation, that the first target terminal receives a downlink data channel scheduled by the fourth control channel includes:

the first target terminal switches its operating frequency to a frequency corresponding to the fourth BWP and starts no earlier than a fifth moment to monitor the downlink data channel scheduled by the fourth control channel.

Optionally, in a possible implementation, that the first target terminal receives a downlink data channel scheduled by the fourth control channel includes:

in a case that the network-side device has configured a downlink control channel search space set for the first target terminal on the third BWP in downlink, the first target terminal receives, on the third BWP in downlink, the downlink data channel scheduled by the fourth control channel; and in a case that the network-side device has configured no downlink control channel search space set for the first target terminal on the third BWP in downlink, the first target terminal switches its operating frequency to the frequency corresponding to the fourth BWP and starts no earlier than a fifth moment to monitor the downlink data channel scheduled by the fourth control channel.

Optionally, in a possible implementation, that the first target terminal performs feedback for the received downlink data channel includes:

in a case that the first target terminal receives the downlink data channel on the third BWP in downlink, the first target terminal transmits a second uplink physical control channel on the third BWP in uplink, where the second uplink physical control channel carries feedback information for the downlink data channel; and in a case that the first target terminal receives the downlink data channel on the fourth BWP in downlink, the first target terminal switches its operating frequency to the frequency corresponding to the third BWP and transmits a first uplink physical channel, where the first uplink physical channel carries feedback information for the downlink data channel; or in a case that the network-side device configures an uplink control channel search space set for the first target terminal on the fourth BWP in uplink, the first target terminal transmits second uplink physical information on the fourth BWP in uplink, and in a case that the network-side device configures no uplink control channel search space set for the first target terminal on the fourth BWP in uplink, the first target terminal switches its operating frequency to the frequency corresponding to the third BWP and transmits the first uplink physical channel.

Optionally, in the foregoing possible implementation, a minimum time difference between the first symbol in which the first uplink physical channel is located and the last symbol in which the received downlink data channel is located is: $N_{T,1}+0.5+\Delta_{BWPSwitching/RFretuning}$ milliseconds, where $N_{T,1}$ is a predefined value, and $\Delta_{BWPSwitching/RFretuning}$ is determined based on a time required for switching an operating frequency of a radio frequency component of the first target terminal by the first target terminal; and a minimum time difference between the first symbol in which the second uplink physical channel is located and the last symbol in which the received downlink data channel is located is: $N_{T,1}+0.5$ milliseconds.

Optionally, in a possible implementation, the third moment includes at least one of the following:

(1) a time at least X slots forward from a slot in which a physical uplink data channel for sending the preamble or message A is located, where X is a rational number greater than or equal to 1, and the value of X is determined based on a time required for switching an operating frequency of a radio frequency component by the first target terminal;

(2) a time at least X symbols forward from a symbol in which the physical uplink data channel for sending the preamble or message A is located; and (3) the first symbol of an earliest CORESET in which the fourth control channel is received on Type1 CSS configured for the fourth BWP.

Optionally, in the foregoing possible implementation, the fourth moment is $n=k_2+\Delta+\Delta_{BWPSwitching/RFretuning}$, where n is a slot in which the first target terminal receives RAR information, $k_2$ and $\Delta$ are predefined values, and $\Delta_{BWPSwitchig/RFretuning}$ is determined based on a time required for switching an operating frequency of a radio frequency component of the first target terminal by the first target terminal.

For example, for a terminal performing a random access procedure, if an UL BWP in which uplink transmission is located (denoted as UL BWP #i) and a DL BWP in which downlink reception associated with the uplink transmission is located (denoted as DL BWP #j) have different center frequencies, that is, i≠j, and bandwidths of both the UL BWP #i and DL BWP #j do not exceed the maximum bandwidth capability supported by the terminal, the terminal performs the following operations.

Step 1: The terminal sends a preamble or MSGA on UL BWP #i in which a PRACH resource is located.

Step 2: The terminal switches an operating frequency of a radio frequency component of the terminal to DL BWP #j and opens one time window (time window) at a third moment, and receives, within the time window, a PDCCH scrambled by RA-RNTI and a RAR scheduled by the PDCCH or a PDCCH scrambled by MsgB-RNTI and an MSGB scheduled by the PDCCH.

The third moment is defined as: the first symbol of the earliest CORESET configured for PDCCH reception in Type1 CSS that is at least X slots or symbols forward from a slot in which the preamble/MSGA PUSCH is transmitted or from the last symbol in which the preamble/MSGA PUSCH is transmitted, where X=1, or $X=1+\Delta_{BWPSwitching/RFretuning}$, and a value of $\Delta_{BWPSwitching/RFretuning}$ depends on a time required for switching an operating frequency of a radio frequency component of the terminal by the terminal, which may be specifically defined by the protocol.

Step 3: The terminal switches an operating frequency of a radio frequency component of the terminal to UL BWP #i, transmits a RAR-scheduled PUSCH on the uplink BWP in which the PRACH is transmitted, and transmits the PUSCH at a fourth moment.

The fourth moment is defined as a slot $n+k_2+\Delta+\Delta_{BWPSwitching/RFretuning}$, where n is a slot in which the UE receives RAR information, $k_2$ and $\Delta$ are defined by the protocol. A value of $\Delta_{BWPSwitching/RFretuning}$ depends on a time required for switching an operating frequency of a radio frequency component of the terminal by the terminal, which is defined by the protocol.

Step 4: The following steps 4-1 or 4-2 may be included.

Step 4-1: The terminal switches the operating frequency of the radio frequency component of the terminal to DL BWP #j and the terminal starts no earlier than a fifth moment to monitor a PDSCH scheduled by the PDCCH. The fifth moment is defined as being a time at least Y slots or symbols forward from a slot in which the PUSCH is transmitted in step 3 or after the last symbol of the PUSCH, and the value of Y depends on a time required for switching an operating frequency of a radio frequency component of the terminal by the terminal, which is defined by the protocol.

Step 4-2: If the network side has configured a PDCCH search space set (SS set) on DL BWP #i for the terminal, the terminal does not need to switch the operating frequency of the radio frequency component of the terminal, and the terminal receives, on DL BWP #i, the PDSCH scheduled by the PDCCH; otherwise, the terminal switches the operating frequency of the radio frequency component of the terminal and performs the operation in step 4-1.

Step 5: If downlink reception in step 4 is performed on DL BWP #j, perform step 5-1 or step 5-2. If the downlink reception in step 4 is performed on DL BWP #i, the terminal does not need to switch the operating frequency of the radio frequency component of the terminal, and the terminal transmits a PUCCH on UL BWP #i, where the minimum time difference between the first symbol in which the PUCCH transmission is located and the last symbol in which the PDSCH is received in step 4 is required to satisfy $N_{T,1}$+0.5 milliseconds.

Step 5-1: The terminal needs to switch the operating frequency of the radio frequency component of the terminal to UL BWP #i to perform HARQ-ACK feedback for the PDSCH received in step 4. The HARQ-ACK feedback is carried by a PUCCH, and the minimum time difference between the first symbol in which the PUCCH transmission is located and the last symbol in which the PDSCH is received in step 4 is required to satisfy $N_{T,1}+0.5+\Delta_{BWPSwitching/RFretuning}$ milliseconds. $N_{T,1}$ is provided by existing protocols; and a value of $\Delta_{BWPSwitching/RFretuning}$ depends on a time required for switching an operating frequency of a radio frequency component of the terminal by the terminal, which is defined by the protocol.

Step 5-2: If the network side has configured a PUCCH on UL BWP #j for the terminal, the terminal does not need to switch the operating frequency of the radio frequency component of the terminal, and the terminal transmits a PUCCH on UL BWP #j, where the minimum time difference between the first symbol in which the PUCCH transmission is located and the last symbol in which the PDSCH is received in step 4 is required to satisfy $N_{T,1}$+0.5 milliseconds; otherwise, the terminal switches the operating frequency of the radio frequency component of the terminal and performs the operation of step 5-1.

In the foregoing technical solutions provided in the embodiments of this application, terminals with smaller bandwidth capacity are supported to operate under a system with large bandwidth, reducing the impact on ordinary terminals; in addition, in the method, one or more initial BWPs are configured, not being limited to terminal capacity and type, thereby effectively helping the network to implement load balance between terminals in an initial state, inactive state, or in connected state, and avoiding congestion of legacy UEs using initial BWPs.

The technical solutions provided in the embodiments of this application are described below using a specific embodiment.

To support RedCap UEs on a separate initial DL BWP, it is necessary to include common CORESET(s) and CSS(s) in the separate initial DL BWP. Based on the purposes of using the separate initial DL BWP and/or messages that the network wants to offload, the following four cases can be typically considered.

Case 1: The separate initial DL BWP contains only one Type1-PDCCH CSS set.

Case 2: The separate initial DL BWP contains only one Type2-PDCCH CSS set.

Case 3: The separate initial DL BWP contains Type1- and Type2-PDCCH CSS sets.

Case 4: The separate initial DL BWP contains Type0-, Type0A-, Type1- and Type2-PDCCH CSS sets.

For case 1, typically, the RRC-IDLE or INACTIVE RedCap UE stays on the initial DL BW #0 to monitor a paging PDCCH in the Type2 CSS; and the RedCap UE receives updated SI if the paging PDCCH indicates that the system information (SI) has been changed/updated. Only when random access is triggered, the RedCap UE needs to switch to a separate initial DL BWP, namely separate initial DL BWP #0-1, to receive MSG2 and MSG4. Once an RRC connection is established, the RedCap UE in RRC-CONNECTED state does not need to monitor a paging PDCCH on the initial DL BW #0, and updated system information and/or ETWS/CMAS information may be transferred to the RRC-CONNECTED UE using dedicated RRC signaling. Therefore, case 1 facilitates offloading of messages required for random access and can also be used to align the DL/UL center frequencies in a case that the RedCap UE is configured with a separate initial UL BWP.

For case 2, the Type2-PDCCH CSS set for paging PDCCH is configured on a separate initial DL BWP, namely DL BWP #0-1. Usually, after receiving SIB1 and other SIB s on the initial DL BWP #0, the RRC-IDLE/INACTIVE RedCap UE switches to monitor paging PDCCH on the DL BWP #0-1. If there is a SI change/update indicated by the paging PDCCH, the RedCap UE needs to switch to DL BWP #0. After obtaining the updated SI, the RRC-IDLE/INACTIVE RedCap needs to return to the separate DL BWP #0-1 to continue monitoring on paging PDCCH. In a case that the RRC-IDLE/INACTIVE RedCap UE needs to perform initial access, the RedCap UE needs to switch to DL BWP #0 to receive MSG2/MSG4. It can be seen that case 2 is only beneficial for offloading paging PDCCH and PDSCH on BWP #0. However, the RRC-IDLE/INACTIVE RedCap UE needs to perform BWP switching based on dynamic signaling, which increases complexity of the RedCap UE.

For case 3, the RRC-IDLE/INACTIVE RedCap UE is on a separate initial BWP, namely DL BWP #0-1, to monitor the paging PDCCH and receive MSG2/MSG4 for initial access. The RRC-IDLE/INACTIVE RedCap UE needs to switch to the initial DL BWP, namely DL BWP #0, only when the paging PDCCH indicates that the SI has been updated. Compared to case 1, in case 3, in addition to MSG2/MSG4, the paging PDCCH and PDSCH can also be offloaded. However, similar to case 2, in case 3, the RedCap UE needs to perform BWP switching based on dynamic signaling.

For case 4, once receiving SIB1 and other SIBs on the initial DL BWP #0, the RRC-IDLE/INACTIVE RedCap UE switches to DL BWP #0-1 to monitor the paging PDCCH, to obtain updated SIs, and/or to perform random access. That is, there is no need to switch back to DL BWP #0. In case 4, network overheads are relatively large; however, the terminal no longer needs to perform BWP switching, minimizing complexity of the terminal.

Figure 4:
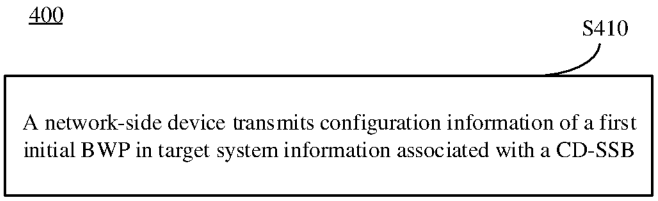
FIG. 4 is a schematic flowchart of a method for configuring an initial BWP according to an embodiment of this application.

FIG. 4 is a schematic flowchart of a method for configuring an initial bandwidth part according to an embodiment of this application. The method 400 may be executed by a network-side device. In other words, the method may be performed by software or hardware installed on the network-side device. As shown in FIG. 4, the method may include the following steps.

S410: The network-side device transmits configuration information of a first initial BWP in target system information associated with a CD-SSB.

The first initial BWP is an initial BWP independently configured by the network-side device for a first target terminal, and a bandwidth of the first initial BWP does not exceed a maximum bandwidth capability supported by the first target terminal.

The method is an operation of the network-side device corresponding to the method 200. The first initial BWP is the same as the first initial BWP in the method 200. For details, refer to the description in the method 200.

In this embodiment of this application, the network-side device is configured with a separate initial BWP (that is, the first initial BWP) for the first target terminal, which may be denoted as BWP #0-1. In addition, a second initial BWP may be configured for a second target terminal, for example, the network-side device configures an initial BWP (which may be denoted as BWP #0 or BWP #0-0) for legacy UE. In this embodiment of this application, the network-side device may configure a plurality of separate initial BWPs. For example, the network-side device configures a plurality of separate initial BWPs or the network-side device configures different separate initial BWPs for UEs with different capability characteristics. For example, the network configures BWP #0-1 for RedCap UEs with 1Rx or HD-FDD, and the network configures BWP #0-2 for non-RedCap UEs/common terminals or RedCap UEs with 2Rx or full duplex FDD, where BWP #0-1 and BWP #0-2 do not fully overlap for frequency domain resources.

In this embodiment of this application, optionally, the legacy UE uses a CORESET #0, denoted as CORESET #0 or CORESET #0-0, and entire frequency domain resources of the CORESET #0 are included in BWP #0. If the network-side device configured a common CORESET (common CORESET) on BWP #0-X (including BWP #0-1 and BWP #0-2), the common CORESET is denoted as CORESET #0-X.

Figure 5:
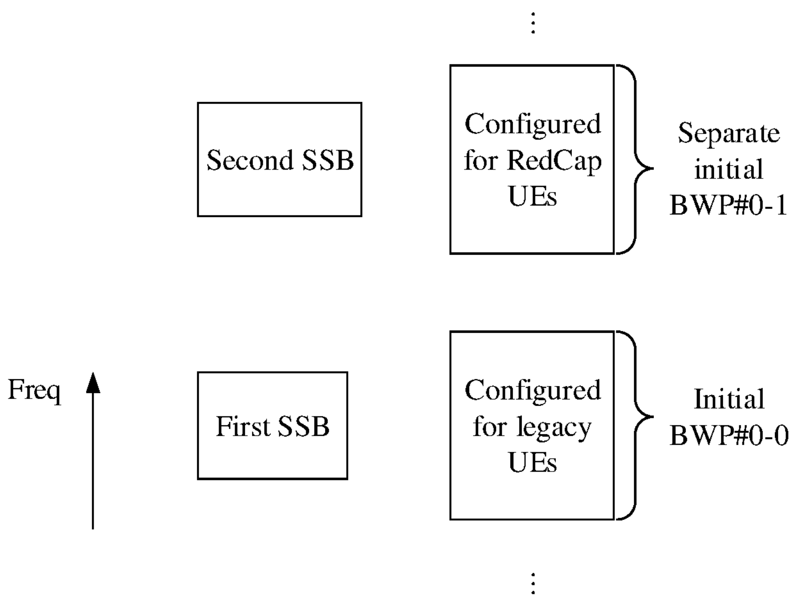
FIG. 5 is a schematic diagram of another initial BWP configuration according to an embodiment of this application.

In this embodiment of this application, the network-side device may configure different SSBs for initial access detection for the first target terminal and the second target terminal. For example, as shown in FIG. 5, SSBs detected during initial access by the legacy UE are CD-SSBs (Cell-defining SSB) or a first SSB set; and SSBs transmitted on the separately configured BWP #0-1 may be denoted as a second SSB set.

Optionally, the first initial BWP includes an initial downlink BWP and/or an initial uplink BWP.

In a possible implementation, the configuration information may configure at least one of the following for the first initial BWP:

(1) SSBs transmitted on the first initial BWP, that is, the second SSB set;

(2) Type0 CSS, where the Type0 CSS is used for scheduling system information 1;

(3) Type0A CSS, where the Type0A CSS is used for scheduling system information of at least one of the following: system information other than the system information 1 shared by the first target terminal and a second target terminal, and system information specific to the first target terminal;

(4) Type0B CSS, where the Type0B CSS is used for scheduling system information specific to the first target terminal;

(5) Type1A CSS, where the Type1A CSS is used for scheduling random access response information for a terminal of a target type, where the terminal of the target type is a terminal that performs small data transmission in random access small data transmission RA-SDT manner;

(6) Type2 CSS, where the Type2 CSS is used for scheduling paging messages;

(7) Type3 CSS, where the Type3 CSS is used for scheduling common information for a group of terminals; and (8) USS.

It should be noted that the method for obtaining an initial bandwidth part configuration provided in the embodiments of this application may be executed by an apparatus for obtaining an initial bandwidth part configuration, or a control module for executing the method for obtaining the initial bandwidth part configuration in the apparatus for obtaining an initial bandwidth part configuration. In the embodiments of this application, the method for obtaining the initial bandwidth part configuration being performed by the apparatus for obtaining the initial bandwidth part configuration is used as an example to describe the apparatus for obtaining the initial bandwidth part configuration provided in the embodiments of this application.

Figure 6:
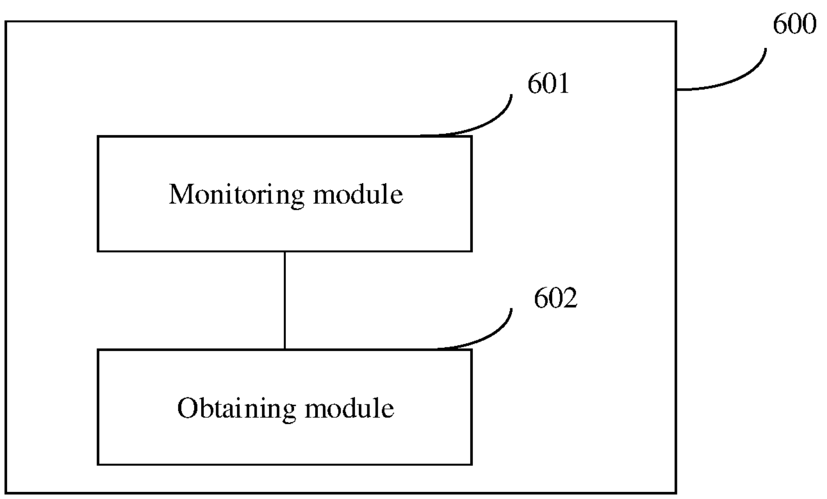
FIG. 6 is a schematic structural diagram of an apparatus for obtaining an initial BWP configuration according to an embodiment of this application.

FIG. 6 is a schematic structural diagram of an apparatus for obtaining an initial bandwidth part configuration according to an embodiment of this application. As shown in FIG. 6, the apparatus mainly includes: a monitoring module 601 and an obtaining module 602.

In this embodiment of this application, the monitoring module 601 is configured to monitor a cell-defining synchronization signal block CD-SSB and obtain target system information associated with the CD-SSB. The obtaining module 602 is configured to: obtain, by decoding the target system information, a first initial bandwidth part BWP configured by a network-side device, where the first initial BWP is an initial BWP independently configured by the network-side device for the first target terminal, and a bandwidth of the first initial BWP does not exceed a maximum bandwidth capability supported by the first target terminal.

In a possible implementation, the monitoring module 601 is further configured to:

in a case that the network-side device configures no first target search space set for the first initial BWP, perform monitoring on and/or reception of a first control channel of the first target search space set on a second initial BWP, where the second initial BWP is an initial BWP configured by the network-side device for a second target terminal; and perform, based on a first control channel detected, reception of a first data channel scheduled by the first control channel.

In a possible implementation, the first target search space set includes at least one of the following search spaces:

Type0 common search space CSS;

Type0A CSS;

Type1 CSS;

Type2 CSS;

Type3 CSS; and user-specific search space USS.

In a possible implementation, that the monitoring module 601 performs, based on a first control channel detected, reception of a first data channel scheduled by the first control channel includes:

performing reception of the first data channel on the second initial BWP.

In a possible implementation, the first target terminal does not expect that a frequency domain resource occupied by the first control channel and/or a frequency domain resource occupied by the first data channel exceeds a maximum bandwidth capability supported by the first target terminal; or in a case that the frequency domain resource occupied by the first control channel exceeds the maximum bandwidth capability supported by the first target terminal and/or the frequency domain resource occupied by the first data channel exceeds the maximum bandwidth capability supported by the first target terminal, the first target terminal is not required to perform monitoring on and/or reception of the first control channel and/or the first data channel that is beyond the bandwidth capability of the first target terminal.

In a possible implementation, that the monitoring module 601 performs, based on a first control channel detected, reception of a first data channel scheduled by the first control channel includes:

performing reception of the first data channel on the first initial BWP.

In a possible implementation, that the monitoring module 601 performs, based on a first control channel detected, reception of a first data channel scheduled by the first control channel includes:

in a case that the first target terminal shares a same first radio network temporary identifier RNTI with the second target terminal, receiving, on the second initial BWP, a first data channel scheduled by a first control channel that is scrambled by the first RNTI; and/or in a case that the first target terminal does not share a second RNTI with the second target terminal, receiving, on the first initial BWP, a first data channel scheduled by a first control channel that is scrambled by the second RNTI.

In a possible implementation, the monitoring module 601 is further configured to:

in a case that the network-side device configures no second target search space set for the first initial BWP, but at least configures a third target search space set for the first initial BWP, perform monitoring on and/or reception of a second control channel of the third target search space set on the first initial BWP; where the second target search space set includes: Type0 CSS;

the third target search space set includes: Type2 CSS and/or Type0B CSS; and the second control channel is a control channel scrambled by a paging RNTI.

In a possible implementation, the monitoring module 601 is further configured to:

in a case that downlink control information carried by the second control channel includes first target information, switch from the first initial BWP to a second initial BWP to receive updated system information; where the second initial BWP is an initial BWP configured by the network-side device for a second target terminal.

In a possible implementation, the first target information includes at least one of the following:

first indication information, where the first indication information indicates presence of a short message in the downlink control information;

second indication information, where the second indication information indicates a change of system information;

third indication information, where the third indication information indicates a change of system information transmitted on the second initial BWP; and fourth indication information, where the fourth indication information is used to indicate an earthquake and tsunami warning system ETWS notification and/or a commercial mobile alert service CAMS notification.

In a possible implementation, the monitoring module 601 is further configured to:

in a case that downlink control information carried by the second control channel includes second target information, continue with reception of a paging data channel on the first initial BWP, and/or transmit, on the first initial BWP, system information scheduled by Type0A CSS and/or Type0B CSS.

In a possible implementation, the second target information includes at least one of the following:

fifth indication information, where the fifth indication information indicates presence of paging scheduling information in the downlink control information; and sixth indication information, where the sixth indication information indicates a change of system information transmitted on the first initial BWP.

In a possible implementation, the monitoring module 601 is further configured to:

in a case that the network-side device configures no second target search space set for the first initial BWP, but configures a third target search space set for the first initial BWP, if a paging early indication signal PEI is not configured for the first target terminal on a second initial BWP, determine, based on setup of the first target terminal, a first moment for switching to the first initial BWP to perform a paging physical procedure, where the second initial BWP is an initial BWP configured by the network-side device for a second target terminal; where the second target search space set includes: Type0 CSS; and the third target search space set includes: Type2 CSS and/or Type0B CSS.

In a possible implementation, the monitoring module 601 is further configured to:

in a case that the network-side device configures no second target search space set for the first initial BWP, but configures a third target search space set for the first initial BWP, if a paging PEI of the first target terminal is configured and transmitted on a second initial BWP, determine, based on indication of the paging PEI, whether to switch to the first initial BWP to perform a paging physical procedure; where the second initial BWP is an initial BWP configured by the network-side device for a second target terminal;

the second target search space set includes: Type0 CSS; and the third target search space set includes: Type2 CSS and/or Type0B CSS.

In a possible implementation, that the monitoring module 601 determines, based on indication of the paging PEI, whether to switch to the first initial BWP to perform a paging physical procedure includes:

in a case that the paging PEI indicates that the first target terminal needs to monitor a third control channel scrambled by a paging RNTI, switch to the first initial BWP at a second moment to perform the paging physical procedure; and/or in a case that the paging PEI indicates that the first target terminal does not need to monitor the third control channel scrambled by the paging RNTI, skip switching to the first initial BWP.

In a possible implementation, the performing a paging physical procedure includes at least one of the following: performing monitoring on and/or reception of a control channel scrambled by a paging RNTI on Type2 CSS, and performing reception of a paging data channel.

In a possible implementation, the monitoring module 601 is further configured to:

in a process of random access performed by the first target terminal, in a case that a center frequency of a third BWP for uplink transmission is different from a center frequency of a fourth BWP for downlink transmission corresponding to the uplink transmission, perform the following operations:

transmitting a preamble or message A on the third BWP in which a physical random access channel PRACH resource is located;

switching an operating frequency of the first target terminal to a frequency corresponding to the fourth BWP, opening one time window at a third moment, and receiving, within the time window, a fourth control channel and a random access response scheduled by the fourth control channel, where the fourth control channel is scrambled by a random access RNTI or scrambled by a message B RNTI;

switching the operating frequency of the first target terminal to a frequency corresponding to the third BWP and transmitting a RAR-scheduled uplink data channel on the uplink BWP at a fourth moment;

receiving a downlink data channel scheduled by the fourth control channel; and performing feedback for the received downlink data channel.

In a possible implementation, that the monitoring module 601 receives a downlink data channel scheduled by the fourth control channel includes:

switching the operating frequency of the first target terminal to a frequency corresponding to the fourth BWP and starting no earlier than a fifth moment to monitor the downlink data channel scheduled by the fourth control channel.

In a possible implementation, that the monitoring module 601 receives a downlink data channel scheduled by the fourth control channel includes:

in a case that the network-side device has configured a downlink control channel search space set for the first target terminal on the third BWP in downlink, receiving, on the third BWP in downlink, the downlink data channel scheduled by the fourth control channel; and in a case that the network-side device has configured no downlink control channel search space set for the first target terminal on the third BWP in downlink, switching the operating frequency of the first target terminal to the frequency corresponding to the fourth BWP and starting no earlier than a fifth moment to monitor the downlink data channel scheduled by the fourth control channel.

In a possible implementation, that the monitoring module 601 performs feedback for the received downlink data channel includes:

in a case that the monitoring module 601 receives the downlink data channel on the third BWP in downlink, transmitting a second uplink physical control channel on the third BWP in uplink, where the second uplink physical control channel carries feedback information for the downlink data channel; and in a case that the monitoring module 601 receives the downlink data channel on the fourth BWP in downlink, switching the operating frequency of the first target terminal to the frequency corresponding to the third BWP and transmitting a first uplink physical channel, where the first uplink physical channel carries feedback information for the downlink data channel; or in a case that the network-side device configures an uplink control channel search space set for the first target terminal on the fourth BWP in uplink, transmitting second uplink physical information on the fourth BWP in uplink, or in a case that the network-side device configures no uplink control channel search space set for the first target terminal on the fourth BWP in uplink, switching the operating frequency of the first target terminal to the frequency corresponding to the third BWP and transmitting the first uplink physical channel.

In a possible implementation, a minimum time difference between the first symbol in which the first uplink physical channel is located and the last symbol in which the received downlink data channel is located is: $N_{T,1}+0.5+\Delta_{BWPSwitching/RFretuning}$ milliseconds, where $N_{T,1}$ is a predefined value, and $\Delta_{BWPSwitching/RFretuning}$ is determined based on a time required for switching an operating frequency of a radio frequency component of the first target terminal by the first target terminal; and a minimum time difference between the first symbol in which the second uplink physical channel is located and the last symbol in which the received downlink data channel is located is: $N_{T,1}+0.5$ milliseconds.

In a possible implementation, the third moment includes at least one of the following:

a time at least X slots forward from a slot in which a physical uplink data channel for sending the preamble or message A is located, where X is a rational number greater than or equal to 1, and the value of X is determined based on a time required for switching an operating frequency of a radio frequency component by the first target terminal;

a time at least X symbols forward from a symbol in which the physical uplink data channel for sending the preamble or message A is located; and the first symbol of an earliest CORESET in which the fourth control channel is received on Type1 CSS configured for the fourth BWP.

In a possible implementation, the fourth moment is $n+k_2+\Delta+\Delta_{BWPSwitching/RFretuning}$ where n is a slot in which the first target terminal receives RAR information, $k_2$ and $\Delta$ are predefined values, and $\Delta_{BWPSwitching/RFretuning}$ is determined based on a time required for switching an operating frequency of a radio frequency component of the first target terminal by the first target terminal.

The apparatus for obtaining an initial bandwidth part configuration in this embodiment of this application may be an apparatus, or may be a component, an integrated circuit, or a chip in a terminal. The apparatus may be a mobile terminal or a non-mobile terminal. For example, the mobile terminal may include but is not limited to the types of the terminal 11 listed above, and the non-mobile terminal may be a server, a network attached storage (Network Attached Storage, NAS), a personal computer (personal computer, PC), a television (television, TV), a teller machine, a self-service machine, or the like, which is not specifically limited in this embodiment of this application.

The apparatus for obtaining an initial bandwidth part configuration in this embodiment of this application may be an apparatus with an operating system. The operating system may be an Android (Android) operating system, an iOS operating system, or other possible operating systems, and is not specifically limited in the embodiments of this application.

The apparatus for obtaining an initial bandwidth part configuration provided in this embodiment of this application is capable of implementing the processes implemented by the first target terminal in the method embodiments in FIG. 2 to FIG. 5, with the same technical effects achieved. To avoid repetition, details are not described herein again.

Figure 7:
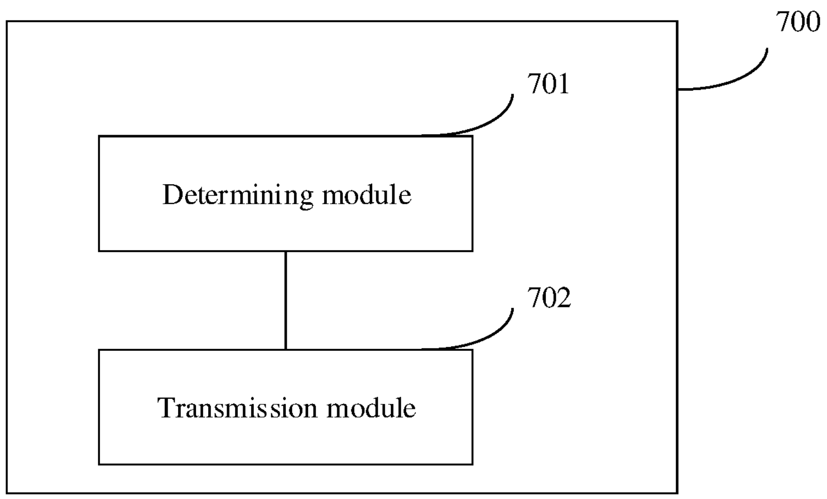
FIG. 7 is a schematic structural diagram of an apparatus for configuring an initial BWP according to an embodiment of this application.

FIG. 7 is a schematic structural diagram of an apparatus for configuring an initial bandwidth part according to an embodiment of this application. As shown in FIG. 7, the apparatus mainly includes: a determining module 701 and a transmission module 702.

In this embodiment of this application, the determining module 701 is configured to: determine configuration information for a first initial BWP; and a transmission module 702 configured to: transmit the configuration information for the first initial BWP in target system information associated with a CD-SSB; where the first initial BWP is an initial BWP independently configured for a first target terminal, and a bandwidth of the first initial BWP does not exceed a maximum bandwidth capability supported by a first target terminal.

In a possible implementation, the first initial BWP includes an initial downlink BWP and/or an initial uplink BWP.

In a possible implementation, the configuration information configures at least one of the following for the first initial BWP:

SSB to be transmitted on the first initial BWP;

Type0 CSS, where the Type0 CSS is used for scheduling system information 1;

Type0A CSS, where the Type0A CSS is used for scheduling system information of at least one of the following: system information other than the system information 1 shared by the first target terminal and a second target terminal, and system information specific to the first target terminal;

Type0B CSS, where the Type0B CSS is used for scheduling system information specific to the first target terminal;

Type1A CSS, where the Type1A CSS is used for scheduling random access response information for a terminal of a target type, where the terminal of the target type is a terminal that performs small data transmission in random access small data transmission RA-SDT manner;

Type2 CSS, where the Type2 CSS is used for scheduling paging messages;

Type3 CSS, where the Type3 CSS is used for scheduling common information for a group of terminals; and user-specific SS.

Figure 8:
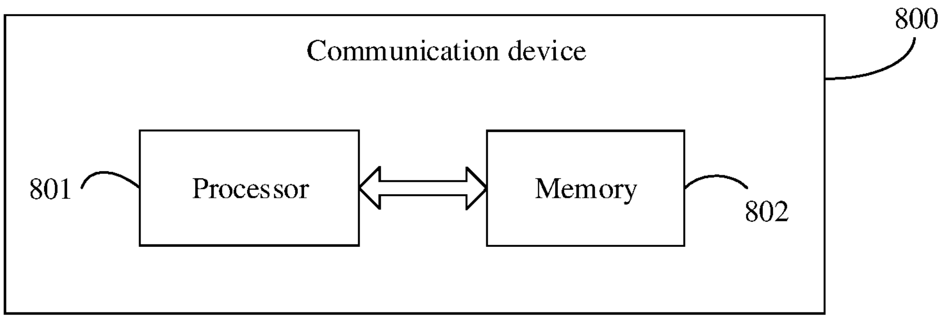
FIG. 8 is a schematic structural diagram of a communication device according to an embodiment of this application.

Optionally, as shown in FIG. 8, an embodiment of this application further provides a communication device 800, including a processor 801, a memory 802, and a program or instructions stored in the memory 802 and capable of running on the processor 801. For example, when the communication device 800 is a terminal and when the program or the instructions are executed by the processor 801, the processes of the foregoing embodiment of the method for obtaining an initial bandwidth part configuration are implemented, with the same technical effects achieved. When the communication device 800 is a network-side device and when the program or the instructions are executed by the processor 801, the processes of the foregoing embodiment of the method for configuring an initial bandwidth part are implemented, with the same technical effects achieved. To avoid repetition, details are not described herein again.

Figure 9:
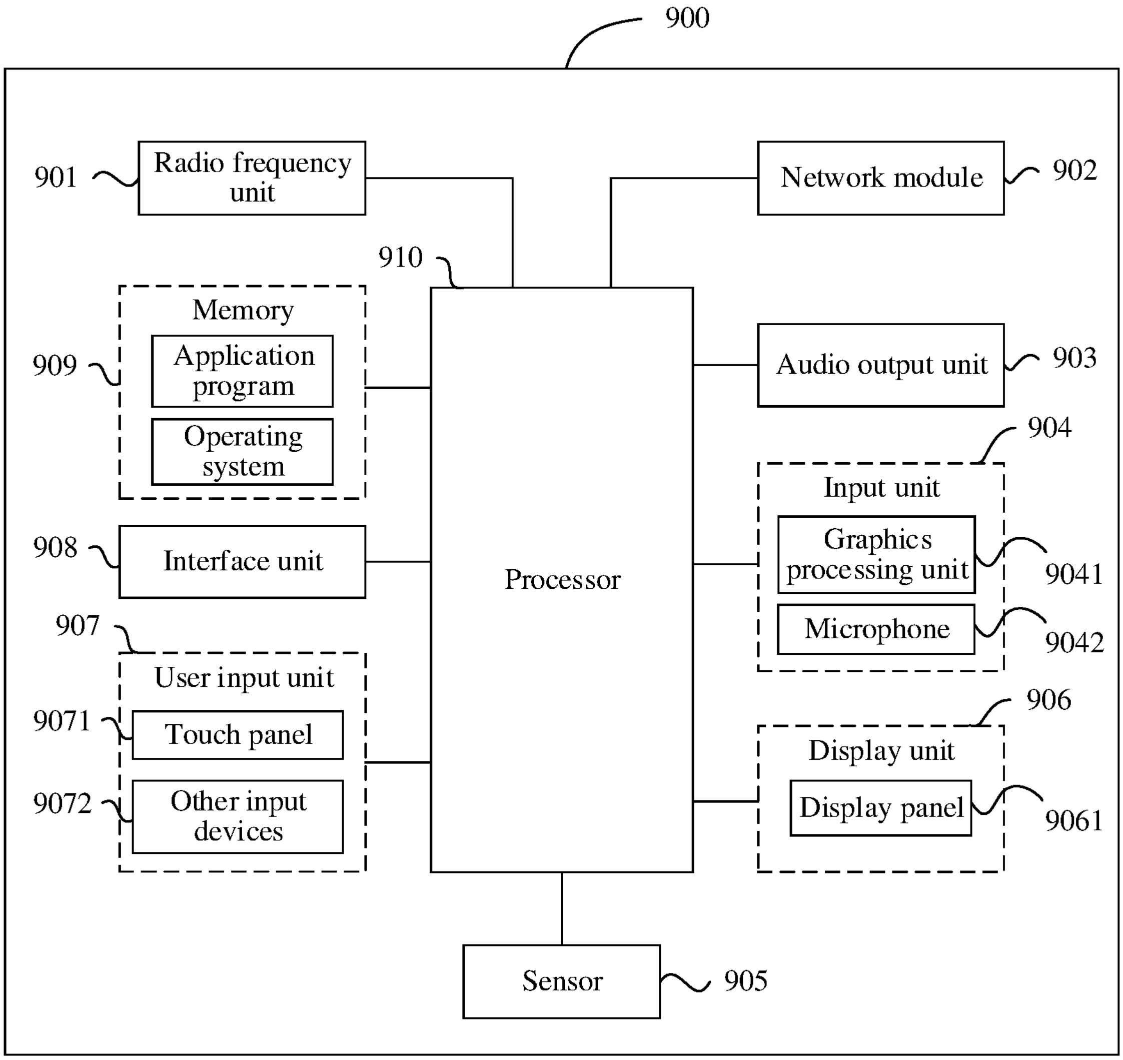
FIG. 9 is a schematic diagram of a hardware structure of a terminal according to an embodiment of this application.

An embodiment of this application further provides a terminal, including a processor and a communication interface, the processor is configured to implement the method for obtaining an initial bandwidth part configuration provided in the foregoing method embodiments, and the communication interface is configured to communicate with the network-side device. The terminal embodiments correspond to the foregoing terminal-side method embodiments, and the implementation processes and implementations of the foregoing method embodiments can be applied to the terminal embodiments, with the same technical effects achieved. Specifically, FIG. 9 is a schematic diagram of a hardware structure of a terminal for implementing the embodiments of this application.

The terminal 900 includes but is not limited to components such as a radio frequency unit 901, a network module 902, an audio output unit 903, an input unit 904, a sensor 905, a display unit 906, a user input unit 907, an interface unit 908, a memory 909, and a processor 910.

Persons skilled in the art can understand that the terminal 900 may further include a power supply (for example, a battery) supplying power to the components, and the power supply may be logically connected to the processor 910 through a power management system. In this way, functions such as charge management, discharge management, and power consumption management are implemented by using the power management system. The structure of the terminal shown in FIG. 9 does not constitute any limitation on the terminal. The terminal may include more or fewer components than those shown in FIG. 9, or a combination of some components, or the components disposed differently. Details are not described herein again.

It can be understood that in this embodiment of this application, the input unit 904 may include a graphics processing unit (Graphics Processing Unit, GPU) 9041 and a microphone 9042. The graphics processing unit 9041 processes image data of a still picture or video obtained by an image capture apparatus (such as a camera) in a video capture mode or an image capture mode. The display unit 906 may include a display panel 9061, and the display panel 9061 may be configured in a form of a liquid crystal display, an organic light-emitting diode, and the like. The user input unit 907 may include a touch panel 9071 and other input devices 9072. The touch panel 9071 is also referred to as a touchscreen. The touch panel 9071 may include two parts: a touch detection apparatus and a touch controller. The other input devices 9072 may include but are not limited to a physical keyboard, a function key (such as a volume control key or a power on/off key), a trackball, a mouse, a joystick, and the like. Details are not described herein.

In this embodiment of this application, the radio frequency unit 901 receives downlink data from a network-side device, and then sends the downlink data to the processor 910 for processing; and also sends uplink data to the network-side device. Generally, the radio frequency unit 901 includes but is not limited to an antenna, at least one amplifier, a transceiver, a coupler, a low noise amplifier, a duplexer, and the like.

The memory 909 may be configured to store software programs or instructions and various data. The memory 909 may include a program or instruction storage area and a data storage area. The program or instruction storage area may store an operating system, an application program or instruction required by at least one function (for example, a sound playback function or an image playback function), and the like. In addition, the memory 909 may include a high-speed random access memory, and may further include a non-volatile memory. The non-volatile memory may be a read-only memory (Read-Only memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-transitory solid-state storage device.

The processor 910 may include one or more processing units. Optionally, an application processor and a modem processor may be integrated in the processor 910. The application processor primarily processes an operating system, user interfaces, application programs or instructions, and the like. The modem processor primarily processes radio communication, for example, being a baseband processor. It can be understood that the modem processor may alternatively be not integrated in the processor 910.

The processor 910 is configured to:

monitor a cell-defining synchronization signal block CD-SSB and obtain target system information associated with the CD-SSB; and obtain, by decoding the target system information, a first initial bandwidth part BWP configured by a network-side device, where the first initial BWP is an initial BWP independently configured by the network-side device for the first target terminal, and a bandwidth of the first initial BWP does not exceed a maximum bandwidth capability supported by the first target terminal.

An embodiment of this application further provides a network-side device, including a processor and a communication interface, the processor is configured to implement the method for configuring an initial bandwidth part provided in the foregoing method embodiments, and the communication interface is configured to communicate with the terminal. The network-side device embodiments correspond to the foregoing terminal-side method embodiments, and the implementation processes and implementations of the foregoing method embodiments can be applied to the network-side device embodiments, with the same technical effects achieved.

Figure 10:
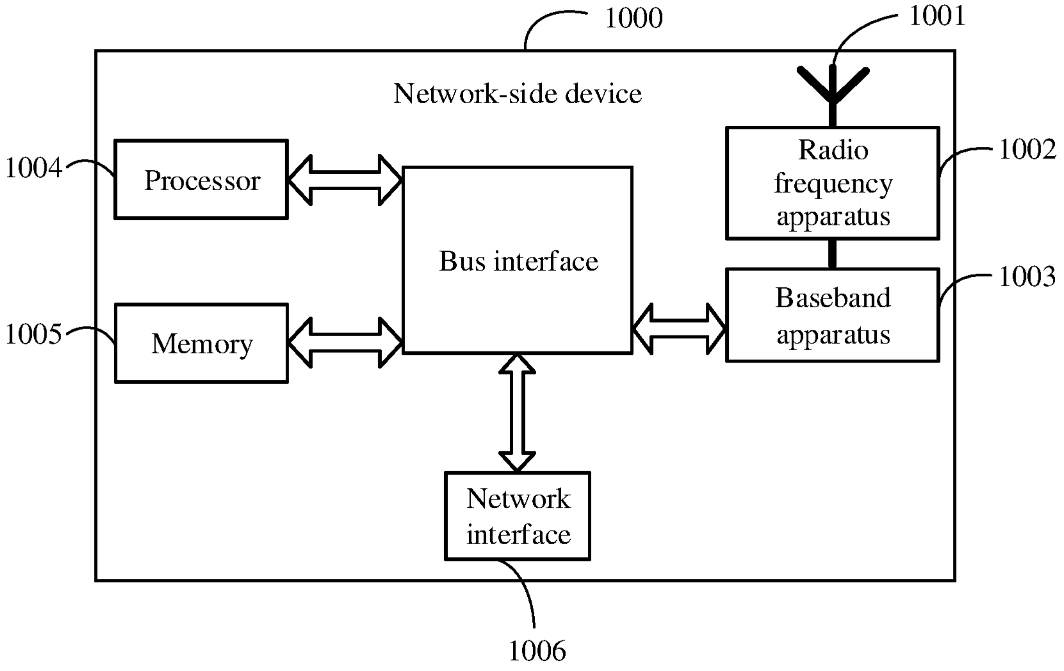
FIG. 10 is a schematic diagram of a hardware structure of a network-side device according to an embodiment of this application.

Specifically, an embodiment of this application further provides a network-side device. As shown in FIG. 10, the network-side device 1000 includes an antenna 1001, a radio frequency apparatus 1002, and a baseband apparatus 1003. The antenna 1001 is connected to the radio frequency apparatus 1002. In an uplink direction, the radio frequency apparatus 1002 receives information by using the antenna 1001, and sends the received information to the baseband apparatus 1003 for processing. In a downlink direction, the baseband apparatus 1003 processes to-be-sent information, and sends the information to the radio frequency apparatus 1002; and the radio frequency apparatus 1002 processes the received information and then sends the information out by using the antenna 1001.

The frequency band processing apparatus may be located in the baseband apparatus 1003. The method performed by the network-side device in the foregoing embodiments may be implemented in the baseband apparatus 1003, and the baseband apparatus 1003 includes a processor 1004 and a memory 1005.

The baseband apparatus 1003 may include, for example, at least one baseband processing unit, where a plurality of chips are disposed on the baseband processing unit. As shown in FIG. 10, one of the chips is, for example, the processor 1004, connected to the memory 1005, to invoke a program in the memory 1005 to perform the operation of the network-side device shown in the foregoing method embodiment.

The baseband apparatus 1003 may further include a network interface 1006, configured to exchange information with the radio frequency apparatus 1002, where the interface is, for example, a common public radio interface (common public radio interface, CPRI for short).

Specifically, the network-side device in this embodiment of the present invention further includes: instructions or a program stored in the memory 1005 and capable of running on the processor 1004. The processor 1004 invokes the instructions or program in the memory 1005 to execute the method executed by the modules shown in FIG. 7, with the same technical effects achieved. To avoid repetition, details are not repeated herein.

An embodiment of this application further provides a readable storage medium, where a program or instructions are stored in the readable storage medium. When the program or the instructions are executed by a processor, the processes of the foregoing embodiments of the method for obtaining an initial bandwidth part configuration are implemented or the processes of the foregoing embodiments of the method for configuring an initial bandwidth part are implemented, with the same technical effects achieved. To avoid repetition, details are not described herein again.

The processor is a processor in the terminal described in the foregoing embodiments. The readable storage medium includes a computer-readable storage medium, for example, a computer read-only memory (Read-Only Memory, ROM), a random access memory (Random Access Memory, RAM), a magnetic disk, or an optical disc.

An embodiment of this application further provides a chip, where the chip includes a processor and a communication interface. The communication interface is coupled to the processor, and the processor is configured to run a program or instructions to implement the processes of the foregoing embodiments of the method for obtaining an initial bandwidth part configuration or the processes of the foregoing embodiments of the method for configuring an initial bandwidth part, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program/program product, where the computer program/program product is stored in a non-transitory storage medium, and when being executed by at least one processor, the program/program product is configured to implement the processes of the foregoing embodiments of the method for obtaining an initial bandwidth part configuration or the processes of the foregoing embodiments of the method for configuring an initial bandwidth part, with the same technical effects achieved. To avoid repetition, details are not repeated herein.

It should be noted that in this specification, the term “include”, “comprise”, or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the description of the foregoing implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms without departing from the essence of this application and the protection scope of the claims, and all such forms shall fall within the protection scope of this application.

What is claimed is:

1. A method for obtaining an initial bandwidth part configuration, comprising:

monitoring, by a first target terminal, a cell-defining synchronization signal block CD-SSB and obtaining target system information associated with the CD-SSB;

obtaining, by the first target terminal by decoding the target system information, a first initial bandwidth part BWP configured by a network-side device, wherein the first initial BWP is an initial BWP configured by the network-side device for the first target terminal, and a bandwidth of the first initial BWP does not exceed a maximum bandwidth capability supported by the first target terminal;

in a case that the network-side device configures no first target search space set for the first initial BWP, performing, by the first target terminal, at least one of monitoring on a first control channel of the first target search space set on a second initial BWP and reception of a first control channel of the first target search space set on a second initial BWP, wherein the second initial BWP is an initial BWP configured by the network-side device for a second target terminal; and performing, based on a first control channel detected, reception of a first data channel scheduled by the first control channel.

2. The method according to claim 1, wherein the first target search space set comprises at least one of the following search spaces:

Type0 common search space CSS;

Type0A CSS;

Type1 CSS;

Type2 CSS;

Type3 CSS; and user-specific search space USS.

3. The method according to claim 1, wherein the performing, based on a first control channel detected, reception of a first data channel scheduled by the first control channel comprises:

performing, by the first target terminal, reception of the first data channel on the second initial BWP.

4. The method according to claim 3, wherein the first target terminal does not expect that at least one of a frequency domain resource occupied by the first control channel a frequency domain resource occupied by the first data channel exceeds a maximum bandwidth capability supported by the first target terminal; or in a case where at least one of the following conditions is met:

the frequency domain resource occupied by the first control channel exceeds the maximum bandwidth capability supported by the first target terminal; and the frequency domain resource occupied by the first data channel exceeds the maximum bandwidth capability supported by the first target terminal, the first target terminal is not required to perform at least one of:

monitoring on at least one of the first control channel and the first data channel that is beyond the bandwidth capability of the first target terminal; and reception of at least one of the first control channel and the first data channel that is beyond the bandwidth capability of the first target terminal.

5. The method according to claim 1, wherein the performing, based on a first control channel detected, reception of a first data channel scheduled by the first control channel comprises:

performing, by the first target terminal, reception of the first data channel on the first initial BWP.

6. The method according to claim 1, wherein the performing, based on a first control channel detected, reception of a first data channel scheduled by the first control channel comprises at least one of:

in a case that the first target terminal shares a same first radio network temporary identifier RNTI with the second target terminal, receiving, by the first target terminal on the second initial BWP, a first data channel scheduled by a first control channel that is scrambled by the first RNTI; and in a case that the first target terminal does not share a second RNTI with the second target terminal, receiving, by the first target terminal on the first initial BWP, a first data channel scheduled by a first control channel that is scrambled by the second RNTI.

7. The method according to claim 1, wherein the method further comprises:

in a case that the network-side device configures no second target search space set for the first initial BWP, but configures a third target search space set for the first initial BWP, performing, by the first target terminal, at least one of:

monitoring on a second control channel of the third target search space set on the first initial BW; and reception of a second control channel of the third target search space set on the first initial BWP; wherein the second target search space set comprises: Type0 CSS;

the third target search space set comprises: at least one of Type2 CSS and/or Type0B CSS; and the second control channel is a control channel scrambled by a paging RNTI.

8. The method according to claim 7, wherein the method further comprises:

in a case that downlink control information carried by the second control channel comprises first target information, the first target terminal switches from the first initial BWP to a second initial BWP to receive updated system information; wherein the second initial BWP is an initial BWP configured by the network-side device for a second target terminal.

9. The method according to claim 8, wherein the first target information comprises at least one of the following:

first indication information, wherein the first indication information indicates presence of a short message in the downlink control information;

second indication information, wherein the second indication information indicates a change of system information;

third indication information, wherein the third indication information indicates a change of system information transmitted on the second initial BWP; and fourth indication information, wherein the fourth indication information is used to indicate at least one of an earthquake and tsunami warning system ETWS notification and a commercial mobile alert service CAMS notification.

10. The method according to claim 7, wherein the method further comprises:

in a case that downlink control information carried by the second control channel comprises second target information, the first target terminal performs at least one of:

continuing with reception of a paging data channel on the first initial BWP; and transmitting, on the first initial BWP, system information scheduled by at least one of Type0A CSS and Type0B CSS.

11. The method according to claim 10, wherein the second target information comprises at least one of the following:

fifth indication information, wherein the fifth indication information indicates presence of paging scheduling information in the downlink control information; and sixth indication information, wherein the sixth indication information indicates a change of system information transmitted on the first initial BWP.

12. The method according to claim 1, wherein the method further comprises:

in a case that the network-side device configures no second target search space set for the first initial BWP, but configures a third target search space set for the first initial BWP, if a paging early indication signal PEI is not configured for the first target terminal on a second initial BWP, determining, by the first target terminal based on its own setup, a first moment for switching to the first initial BWP to perform a paging physical procedure, wherein the second initial BWP is an initial BWP configured by the network-side device for a second target terminal; wherein the second target search space set comprises: Type0 CSS; and the third target search space set comprises: at least one of Type2 CSS and Type0B CSS.

13. The method according to claim 1, wherein the method further comprises:

in a case that the network-side device configures no second target search space set for the first initial BWP, but configures a third target search space set for the first initial BWP, if a paging PEI of the first target terminal is configured and transmitted on a second initial BWP, determining, by the first target terminal based on indication of the paging PEI, whether to switch to the first initial BWP to perform a paging physical procedure; wherein the second initial BWP is an initial BWP configured by the network-side device for a second target terminal;

the second target search space set comprises: Type0 CSS; and the third target search space set comprises: at least one of Type2 CSS and/or Type0B CSS.

14. The method according to claim 13, wherein the determining, by the first target terminal based on indication of the paging PEI, whether to switch to the first initial BWP to perform a paging physical procedure comprises at least one of:

in a case that the paging PEI indicates that the first target terminal needs to monitor a third control channel scrambled by a paging RNTI, switching, by the first target terminal, to the first initial BWP at a second moment to perform the paging physical procedure; and in a case that the paging PEI indicates that the first target terminal does not need to monitor the third control channel scrambled by the paging RNTI, skipping switching, by the first target terminal, to the first initial BWP.

15. The method according to claim 1, wherein the method further comprises:

in a process of random access performed by the first target terminal, in a case that a center frequency of a third BWP for uplink transmission is different from a center frequency of a fourth BWP for downlink transmission corresponding to the uplink transmission, performing, by the first target terminal, the following operations:

the first target terminal transmits a preamble or message A on the third BWP in which a physical random access channel PRACH resource is located;

the first target terminal switches its operating frequency to a frequency corresponding to the fourth BWP, opens one time window at a third moment, and receives, within the time window, a fourth control channel and a random access response scheduled by the fourth control channel, wherein the fourth control channel is scrambled by a random access RNTI or scrambled by a message B RNTI;

the first target terminal switches its operating frequency to a frequency corresponding to the third BWP and transmits a RAR-scheduled uplink data channel on the third BWP at a fourth moment;

the first target terminal receives a downlink data channel scheduled by the fourth control channel; and the first target terminal performs feedback for the received downlink data channel.

16. The method according to claim 15, wherein that the first target terminal receives a downlink data channel scheduled by the fourth control channel comprises:

the first target terminal switches its operating frequency to a frequency corresponding to the fourth BWP and starts no earlier than a fifth moment to monitor the downlink data channel scheduled by the fourth control channel.

17. A method for configuring an initial bandwidth part, comprising:

transmitting, by a network-side device, configuration information of a first initial BWP in target system information associated with a CD-SSB; wherein the first initial BWP is an initial BWP configured by the network-side device for a first target terminal, and a bandwidth of the first initial BWP does not exceed a maximum bandwidth capability supported by the first target terminal;

the method further comprises:

in a case that the network-side device configures no first target search space set for the first initial BWP, performing, by the first target terminal, at least one of monitoring on a first control channel of the first target search space set on a second initial BWP and reception of a first control channel of the first target search space set on a second initial BWP, wherein the second initial BWP is an initial BWP configured by the network-side device for a second target terminal; and performing, based on a first control channel detected, reception of a first data channel scheduled by the first control channel.

18. A network-side device, comprising a processor, a memory, and a program or instructions stored in the memory and capable of running on the processor, wherein when the program or the instructions are executed by the processor, the steps of the method for configuring an initial bandwidth part according to claim 17 are implemented.

19. A terminal, comprising; a processor, a memory, and a program or instructions stored in the memory and capable of running on the processor, wherein when the program or the instructions are executed by the processor, the following steps of a method for obtaining an initial bandwidth part configuration are implemented:

monitoring, by a first target terminal, a cell-defining synchronization signal block CD-SSB and obtaining target system information associated with the CD-SSB;

obtaining, by the first target terminal by decoding the target system information, a first initial bandwidth part BWP configured by a network-side device, wherein the first initial BWP is an initial BWP configured by the network-side device for the first target terminal, and a bandwidth of the first initial BWP does not exceed a maximum bandwidth capability supported by the first target terminal;

in a case that the network-side device configures no first target search space set for the first initial BWP, performing, by the first target terminal, at least one of monitoring on a first control channel of the first target search space set on a second initial BWP and reception of a first control channel of the first target search space set on a second initial BWP, wherein the second initial BWP is an initial BWP configured by the network- side device for a second target terminal; and performing, based on a first control channel detected, reception of a first data channel scheduled by the first control channel.

* * * * *